Patented Apr. 18, 1944

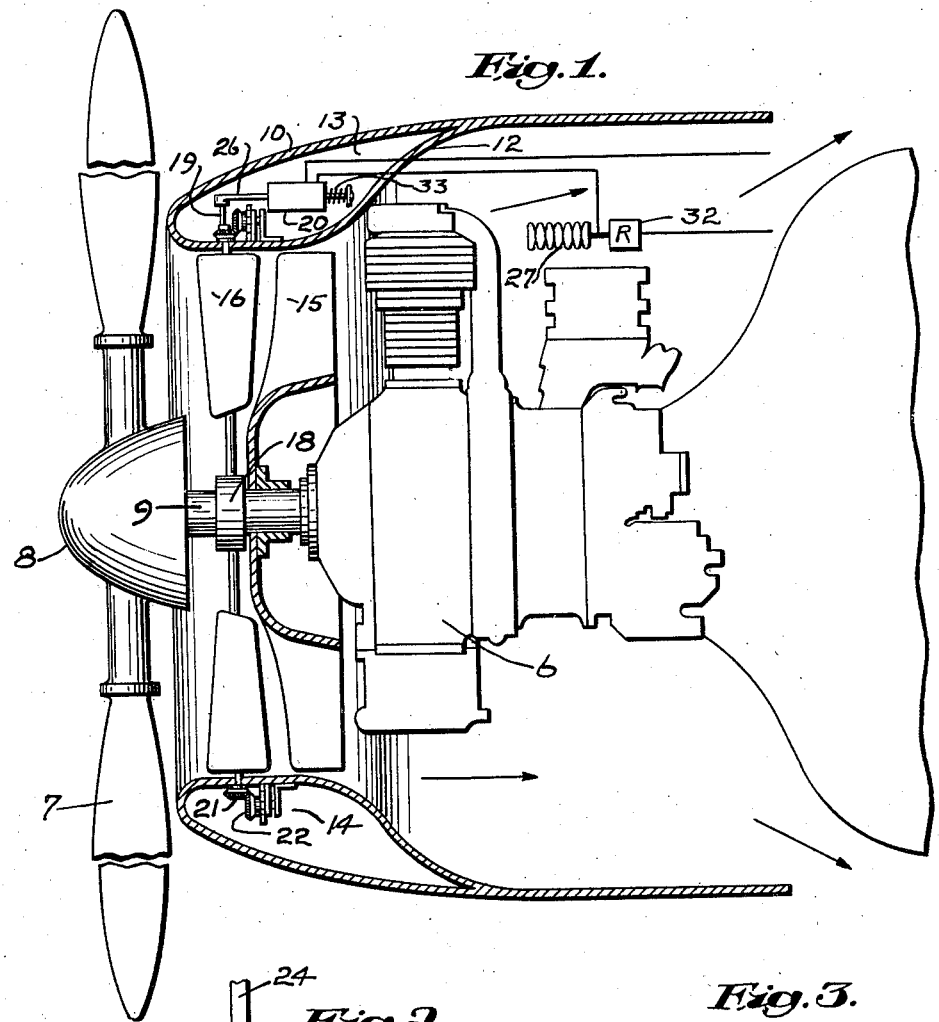
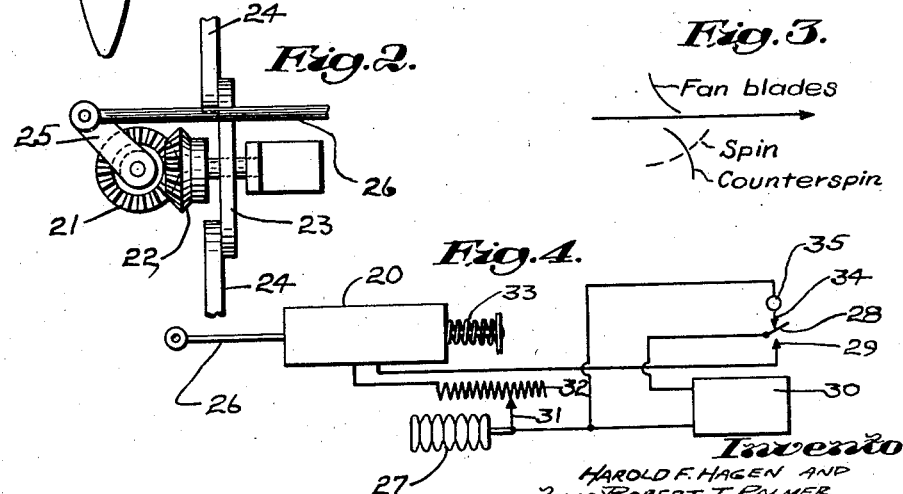

2,347,153

UNITED STATES PATENT OFFICE 2,347,153

ENGINE COOLING SYSTEM

Harold F. Hagen, Wellesley, and Robert T. Palmer, Sharon, Mass., assignors to B. F. Sturtevant Company, Boston, Mass.

Application September 25, 1942, Serial No. 459,608

3 Claims. (Cl. 123—171)

This invention relates to the cooling of internal combustion engines and relates more particularly to the cooling of internal combustion engines in airplanes.

Airplanes generally depend for engine cooling action, upon the impact of the moving surfaces to be cooled against the air. In an airplane having an engine with radial cylinders, with a tractor propeller, the air pressure for providing the necessary air volume for cooling is provided by the pressure or ram impact of the frontal surface of the engine against the air into which the engine is moved by the propeller, and by the suction impact of the flaps in the air exit openings.

It can be demonstrated that a properly designed propeller fan driven by the airplane engine will provide the air pressure for cooling the engine when all of the cooling work is done by the fan, much more efficiently than it can be provided by ram and flap action, and furthermore that such a fan will provide greater air pressures than can be provided by ram and flap action for effective cooling in very high altitudes where due to the low density of the air, the ram and flap action has been insufficient for providing the necessary cooling.

However the cooling load varies and a fan designed for cooling an engine in stratosphere flying would consume too much power at sea level. For example, it has been calculated that a fan for performing all of the work in cooling a 2,200 horsepower motor at 40,000 feet, would itself require 400 horsepower at sea level. It is desirable therefore to be able to reduce the fan power when reduced cooling will suffice and to do this automatically, thus removing another burden from the pilot.

This invention provides a propeller fan of the type disclosed in the H. F. Hagen application, Serial No. 357,767 filed Sept. 21, 1940, for cooling an internal combustion engine; provides spin inducing vanes of the type disclosed in the H. F. Hagen Patent No. 1,989,413 which issued Jan. 29, 1935, in the inlet of the fan, and provides a thermostatic control responsive to the temperature of the engine for adjusting the spin vanes to increase the spin of the air entering the fan when the temperature of the engine is below the critical temperature, and for adjusting the vanes to non-spin or counter-spin position when increased cooling is required. The spinning of the air entering the fan decreases the cooling effect of the fan while reducing its load upon the engine.

This invention also provides a manual control for restoring the vanes to maximum spin position regardless of the cooling requirements, for removing the load of the fan from the engine as when maximum climb, or maximum speed is required in combat. When this control is operated to remove the fan load from the engine, a signal in the pilot's cockpit indicates continuously to him that the cooling facilities are inactive and should be restored when the emergency is over.

Objects of the invention are to reduce the power required by a propeller fan driven by an engine for cooling the engine, by adjusting spin inducing vanes in the inlet of the fan, under the control of a thermostat responsive to engine temperatures, when maximum cooling is not required, and to disconnect the thermostatic control and to adjust the vanes to maximum spin position, when it is momentarily more important to have maximum engine power available than it is to have adequate cooling.

The invention will now be described with reference to the drawing, of which:

Fig. 1 is an elevation view, partially in section of one embodiment of this invention for cooling a radial, airplane engine;

Fig. 2 is an enlarged plan view looking downwardly upon a portion of the spin adjusting mechanism of Fig. 1;

Fig. 3 is a diagrammatic view illustrating the position of the spin vanes for counter-spin and for maximum spin, and Fig. 4 is a diagrammatic view of the electrical control circuit used for disconnecting the thermostat of Fig. 1 from control of the spin vanes.

The engine 6 is a conventional, radial, air cooled airplane engine and has the usual propeller 7 with streamlined hub 8 mounted on the outer end of its shaft 9.

The cowl 10 is around the engine and at its front end has an inner wall 12 which forms the chamber 13 for enclosing the spin vane adjusting mechanism indicated generally by 14. The propeller fan 15 is mounted on the shaft 9 adjacent the engine 6.

The spin vanes 16 are mounted between the propeller 7 and the fan 15. The bases of the vanes 16 are secured to the rods 17, the lower ends of which are pivoted in the outer housing of the bearing 18 for rotation thereon. The bearing 18 is supported by the shaft 9 and serves to support the inner ends of the vanes 16.

The vanes 16 are attached at their tips to the rods 19 and are pivoted in the inner wall 12 of the cowl 10. The rods 19 have mounted thereon the bevel gears 21 which mesh with the bevel gears 22 mounted on the lever 23. The levers 23 are interconnected by the links 24. The lever 25 attached to the uppermost of the rods 19 is rotatable through an angle of about 115° by the rod 26 which extends as a plunger into the electric solenoid 20 which adjusts the vanes under the control of the bellows type thermostat 27.

The control circuit of the thermostat 27 will be explained with reference to Fig. 4. The manual operated switch 28 in the pilot's cockpit when moved against the contact 29, closes the circuit including the switch 28, the battery 30, the movable resistor contact 31, the resistor 32, the winding of the solenoid 26, and the contact 29, placing the thermostat 27 which adjusts the position of the resistor contact 31 along the resistor 32.

The spring on the outer end of the plunger 25 opposes the action of the solenoid, when the latter is energized, in drawing in the plunger 26 and in consequently adjusting the vanes 16 towards open position.

In operation, as the engine temperature increases requring more cooling, the thermostat 27 adjusts the position of the contact 31 along the resistor 32 to decrease the volume of the resistor in the above described electric circuit, causing more circuit to flow through the solenoid 26 and the solenoid to draw in the plunger 25 for adjusting the vanes for less and less spin and finally for counter-spin.

In an emergency such as combat with an enemy aircraft, when the pilot prefers increased engine power to adequate cooling, he moves the switch 28 against the contact 34. This opens the above described circuit and deenergizes the solenoid 26. The spring 33 then moves the plunger 25 to adjust the vanes 16 to maximum spin position, thus decreasing greatly the action of the fan 15 and the power required thereby from the engine 6.

At the same time another circuit including the switch 28, the battery 30, and the signal 35 is closed. The signal 35 may be a red light on the dash of the airplane and glows to remind the pilot that the cooling controls have been disconnected, so that he may reconnect them when the emergency has passed.

The switch 28 could logically be operated by adjustment of the throttle. When the throttle is moved all the way forward for maximum engine power the switch 28 could be adjusted thereby to disconnect the thermostat and when the throttle is again adjusted for cruising, the switch could be adjusted to restore the cooling control.

The term "closed position" with reference to adjustment of the vanes 16, is intended to mean maximum spin position. The vanes may be blocked to prevent their complete closing so that some cooling is always provided. The term "open position" is intended to mean the position of no spin or the position of counter-spin.

While one embodiment of the invention has been described for the purpose of illustration, it should be understood that the invention is not limited to the exact apparatus and arrangement of apparatus illustrated as modifications thereof may be suggested by those skilled in the art without departure from the essence of the invention.

What is claimed is:

1. Cooling apparatus for an airplane engine comprising a propeller fan for moving air over the heat exchange surfaces of the engine, spin vanes in the inlet of said fan, means including means responsive to changes in the temperature of said surfaces for adjusting said vanes towards open position upon temperature increases, means opposing the opening of said vanes and exerting pressure to restore them towards closed position, a signal in the cockpit of the airplane, and means manually operated from the cockpit of the airplane for rendering said temperature responsive means ineffective and for causing said opposing means to move said vanes towards closed position, and including means for energizing said signal for indicating that said temperature responsive means has been deenergized.

2. Cooling apparatus for an airplane engine comprising a propeller fan for moving air over the heat exchange surfaces of the engine, spin vanes in the inlet of said fan, means including means responsive to changes in the temperature of said surfaces for adjusting said vanes towards open position upon temperature increases, means opposing the opening of said vanes and exerting pressure to restore them towards closed position, and means for rendering said temperature responsive means ineffective and for causing said opposing means to move said vanes towards closed position.

3. Cooling apparatus for an airplane engine comprising a propeller fan for moving air over the heat exchange surfaces of the engine, means for varying the volume of air moved by said fan, means including means responsive to changes in the temperature of said surfaces for adjusting said volume control means towards open position upon temperature increases, means opposing the opening of said volume control means and exerting pressure to restore same towards closed position, and means for rendering said temperature responsive means ineffective and for causing said opposing means to move said volume control means towards closed position.

HAROLD F. HAGEN.
ROBERT T. PALMER.